UNITED STATES PATENT OFFICE.

VICTOR EMIL MERTZ, OF FALLOWFIELD, MANCHESTER, ENGLAND.

PROCESS OF PRODUCING CUPRAMMONIUM SOLUTION.

954,984.  Specification of Letters Patent. Patented Apr. 12, 1910.

No Drawing.  Application filed January 17, 1910.  Serial No. 538,494.

*To all whom it may concern:*

Be it known that I, VICTOR EMIL MERTZ, a citizen of the Swiss Republic, residing at Fallowfield, Manchester, in the county of Lancaster, England, have invented a certain new and useful Improved Process of Producing Cuprammonium Solutions, of which the following is a specification.

This invention relates to an improved process of producing a stable cuprammonium solution such as is for example particularly desirable for use in the treatment of cellulose for the production of threads.

All cuprammonium solutions possess the defect that, on exposure to the ordinary temperature of the atmosphere, they rapidly decompose, which results in a deposition of cupric oxid their solvent power toward cellulose being thereby considerably impaired. The decomposition proceeds more rapidly as the atmospheric temperature rises, whereas the solubility of cellulose diminishes with the rise in temperature.

To obtain such a stable solution it is necessary to maintain an equilibrium of dissociation in the solution; and to furnish the solution with a sufficient quantity of oxygen to keep the copper in solution. Experiments I have made have shown that organic hydroxyl compounds, particularly glycerol, acetol, or salts of tartaric acid, for example, potassium sodium tartrate, act to maintain such an equilibrium or to keep the balance of the dissociation. As an example a cuprammonium solution may be treated with about 1% of glycerol or about 1% of potassium sodium tartrate. Peroxids and salts of per-acids provide the means for keeping the oxygen in excess. These compounds have the property of liberating active oxygen when in solution. While however, the alkali peroxids, and also hydrogen peroxid, disengage their oxygen very rapidly and with the accompaniment of a violent reaction in a cuprammonium solution, the experiments made have shown that the salts of per-acids liberate oxygen very gradually, and that this oxygen is retained in the solution. Of these salts of per-acids, ammonium persulfate in particular has proved suitable. As an example, a cuprammonium solution may be treated with about 1 to 2% of this salt.

Instead of ammonium persulfate equivalent compounds might be used, such as potassium permanganate, ammonium permanganate, ammonium perchlorate, etc. Of course, in the practical making of the cuprammonium solution, both potassium sodium tartrate and ammonium persulfate, or their equivalents, are added in small quantities to the solution. Solutions so treated will keep for months at ordinary room temperature without being impaired. The solution is distinguished by its bright light blue color, whereas the solution without such additions become progressively darker, until finally a deposition of copper occurs. These salts of the per-acids in particular are particularly suitable because, in consequence of their gradual liberation of oxygen, they exert a favorable influence on the cellulose-dissolving power of the solution.

I claim:—

1. The herein described process for producing a stable cuprammonium solution, which consists in adding an organic hydroxyl compound and an oxidizing salt to said solution.

2. The herein described process for producing a stable cuprammonium solution, which consists in adding to said solution potassium sodium tartrate and an oxidizing salt.

3. The herein described process for producing a stable cuprammonium solution, which consists in adding to said solution an organic hydroxyl compound and ammonium persulfate.

4. The herein described process for producing a stable cuprammonium solution, which consists in adding to said solution a small percentage of potassium sodium tartrate and a small percentage of ammonium persulfate.

In testimony whereof I have hereunto set my hand in the presence of two subscribing witnesses.

VICTOR EMIL MERTZ.

Witnesses:
P. PAVEL,
A. HAWKINS.